(12) United States Patent
Lesage et al.

(10) Patent No.: US 10,550,865 B2
(45) Date of Patent: Feb. 4, 2020

(54) VALVE FOR ELECTROHYDROSTATIC ACTUATOR

(71) Applicant: Goodrich Actuation Systems SAS, Buc (FR)

(72) Inventors: Emmanuel Lesage, Aulnay sur Iton (FR); Jerome Socheleau, Buc (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 197 days.

(21) Appl. No.: 15/712,184

(22) Filed: Sep. 22, 2017

(65) Prior Publication Data

US 2018/0087547 A1 Mar. 29, 2018

(30) Foreign Application Priority Data

Sep. 23, 2016 (EP) .................................. 16190484

(51) Int. Cl.
| | | |
|---|---|---|
| *F15B 15/18* | (2006.01) | |
| *F15B 15/20* | (2006.01) | |
| *B64C 13/42* | (2006.01) | |
| *B64C 13/50* | (2006.01) | |

(52) U.S. Cl.
CPC ............ *F15B 15/202* (2013.01); *B64C 13/42* (2013.01); *B64C 13/503* (2013.01); *B64C 13/504* (2018.01); *F15B 15/18* (2013.01); *F15B 2211/27* (2013.01); *F15B 2211/315* (2013.01); *F15B 2211/426* (2013.01); *F15B 2211/6654* (2013.01)

(58) Field of Classification Search
CPC .................................................. F15B 2211/27
See application file for complete search history.

(56) References Cited

U.S. PATENT DOCUMENTS

| | | | | |
|---|---|---|---|---|
| 6,871,575 | B2 * | 3/2005 | Korogi ................... | E02F 9/2217 137/636.2 |
| 7,254,945 | B1 * | 8/2007 | Sakai ....................... | F15B 7/006 60/476 |
| 7,269,945 | B2 * | 9/2007 | Bae ........................ | E02F 9/2228 60/431 |
| 2008/0022672 | A1 | 1/2008 | He | |

FOREIGN PATENT DOCUMENTS

| | | |
|---|---|---|
| EP | 1164298 A2 | 12/2001 |
| EP | 1495961 A1 | 1/2005 |

OTHER PUBLICATIONS

Extended European Search Report for International Application No. 16190484.2 dated Mar. 20, 2017, 7 pages.

* cited by examiner

*Primary Examiner* — F Daniel Lopez
(74) *Attorney, Agent, or Firm* — Cantor Colburn LLP

(57) ABSTRACT

An electrohydrostatic actuator, comprising an actuator for driving a component, a pump configured to pump hydraulic fluid for operation of the actuator, and a control valve for controlling passage of the hydraulic fluid between the actuator and the pump, wherein the control valve is movable between first and second positions. In the first position the control valve is configured to convey hydraulic fluid from the pump through the control valve for operation of the actuator, and in the second position the control valve is configured to fluidly disconnect the pump and the actuator, and circulate hydraulic fluid arriving from the pump back to the pump via a first constriction within the control valve.

14 Claims, 7 Drawing Sheets

VALVE FOR ELECTROHYDROSTATIC ACTUATOR

FOREIGN PRIORITY

This application claims priority to European Patent Application No. 16190484.2 filed Sep. 23, 2016, the entire contents of which is incorporated herein by reference.

FIELD

The present disclosure relates generally to an electrohydrostatic actuator ("EHA"), and more specifically a hydraulic fluid supply system for an electrohydrostatic actuator, including a control valve for the hydraulic fluid supply system, and methods related thereto.

BACKGROUND

An electrohydrostatic actuator ("EHA") is a hydraulic actuator run and controlled by its own electrically powered motor-pump assembly. This eliminates the need for a separate hydraulic pump.

In aerospace applications, EHAs are typically a power-by-wire ("PBW") device operated by aircraft control & power electronics. EHAs may be used to move aerodynamic surfaces such as a steering flap on an aircraft wing, and have been used to replace conventional hydraulic actuator systems.

It is desired to provide an improved electrohydrostatic actuator, an improved hydraulic fluid supply system for an electrohydrostatic actuator, and an improved control valve for such hydraulic fluid supply system.

SUMMARY

In accordance with an aspect of the disclosure, there is provided a an electrohydrostatic actuator, comprising: an actuator for driving a component; a pump configured to pump hydraulic fluid for operation of the actuator; and a control valve for controlling passage of the hydraulic fluid between the actuator and the pump, wherein the control valve is movable between first and second positions; wherein: in the first position the control valve is configured to convey hydraulic fluid from the pump through the control valve for operation of the actuator; and in the second position the control valve is configured to fluidly disconnect the pump and the actuator, and circulate hydraulic fluid arriving from the pump (e.g., via a supply line) back to the pump via a first constriction (and e.g., via a different supply line) within the control valve.

In the second position the control valve may be configured to send hydraulic fluid arriving from the actuator (e.g., via a supply line) back to the actuator via a second constriction (and e.g., via a different supply line) within the control valve.

When the control valve is in its second position a closed loop for hydraulic fluid may be formed between the pump and the control valve.

The pump may be configured to pump hydraulic fluid around the closed loop, including through the first constriction, when the control valve is in its second position.

The first and/or second constriction may comprise a channel having a reduced cross-sectional area, for example relative to the inlet through which hydraulic fluid enters the valve and is conveyed to the first and/or second constriction respectively.

The first and/or second constriction may comprise a channel having a relatively large upstream cross-sectional area, leading to a tube section having a relatively small cross-sectional area (e.g., a cross-sectional area less than half of said upstream cross-sectional area), then leading to a relatively large downstream cross-sectional area. The upstream and downstream cross-sectional areas may be the same, and/or may form the inlet and outlet respectively of hydraulic fluid into the control valve.

As used herein, "cross-sectional area" is intended to refer to the transverse cross-sectional area, i.e., transverse to the flow direction of fluid.

The actuator may comprise a piston, a first chamber on a first side of the piston and a second chamber on a second, opposite side of the piston, wherein when the control valve is in its second position a fluid path for hydraulic fluid is formed between the first chamber and the second chamber.

The electrohydrostatic actuator may further comprise a first supply line and a second supply line, wherein the first and second supply lines form feed and return paths (respectively) for hydraulic fluid between the pump and the control valve in use.

The first constriction may have a reduced cross-sectional area relative to the first supply line and/or the second supply line.

The electrohydrostatic actuator may further comprise a third supply line and a fourth supply line, wherein the third and fourth supply lines may form feed and return paths for hydraulic fluid between the actuator and the control valve in use.

The second constriction may have a reduced cross-sectional area relative to the third supply line and/or the fourth supply line.

When the control valve is in its first position, the first supply line and the third supply line may fluidly connect a first port of the pump to a first port of the actuator, and the second supply line and the third supply line may fluidly connect a second port of the pump to a second port of the actuator.

The first port and the second port of the pump may form input and output openings for hydraulic fluid being driven by the pump. The first port and the second port of the actuator may form extension and retraction openings respectively for hydraulic fluid being conveyed to the actuator.

The control valve may be configured, in its second position, to fluidly connect the first supply line and the second supply line via the first constriction.

The control valve may be configured, in its second position, to fluidly connect the third supply line and the fourth supply line.

In accordance with an aspect of the disclosure, there is provided a method of operating an electrohydrostatic actuator, comprising: driving a component using an actuator; pumping hydraulic fluid to operate the actuator; and controlling passage of the hydraulic fluid between the actuator and the pump by moving a control valve between first and second positions; wherein: in the first position the control valve conveys hydraulic fluid from the pump through the control valve for operation of the actuator; and in the second position the control valve fluidly disconnects the pump and the actuator, and circulates hydraulic fluid arriving from the pump back to the pump via a first constriction within the control valve.

In the second position the control valve may send hydraulic fluid arriving from the actuator back to the actuator via a second constriction within the control valve.

BRIEF DESCRIPTION OF THE DRAWINGS

Various embodiments will now be described, by way of example only, and with reference to the accompanying drawings in which.

DETAILED DESCRIPTION

An electrohydrostatic actuator assembly may include one or more actuators configured to receive, in use, a supply of hydraulic fluid for operation thereof. The hydraulic fluid may be provided by a hydraulic fluid supply system, which typically includes an electric motor configured to drive a hydraulic fluid pump. Delivery of the hydraulic fluid to the actuator(s) may be controlled using a control valve, and the direction of actuation may be controlled using the rotational (or pumping) direction of the pump.

A conventional electrohydrostatic actuator system as is known in the prior art will now be described.

Figure 1A:
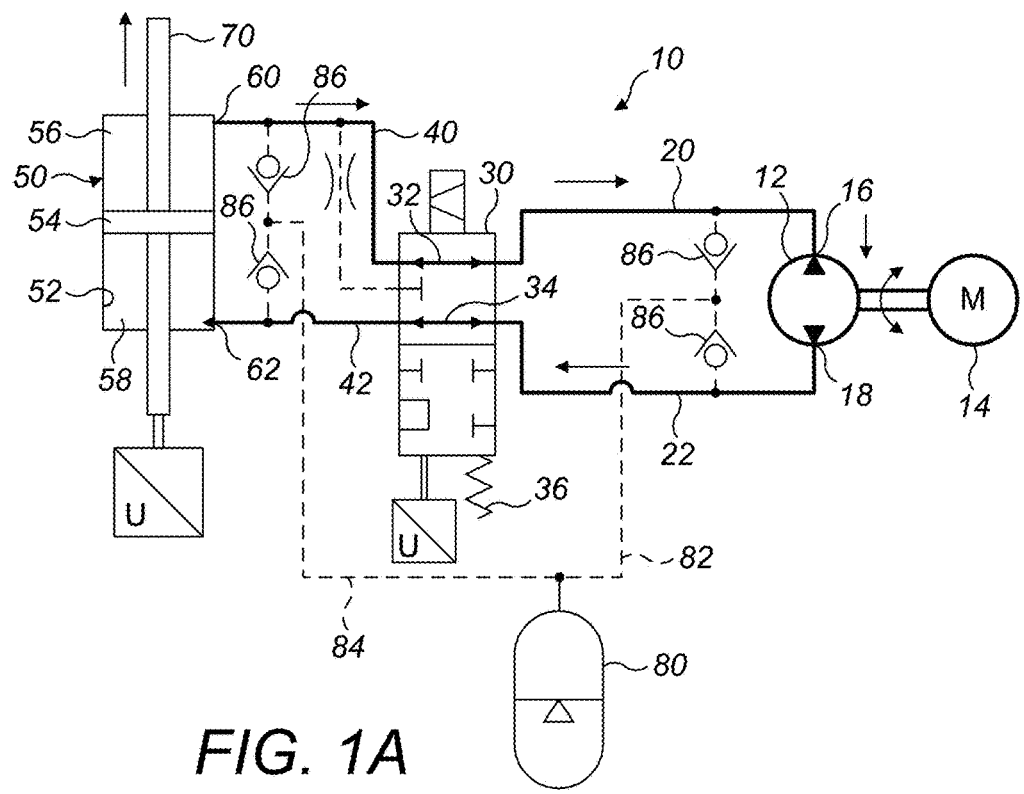
FIGS. 1A and 1B show a conventional electrohydrostatic actuator system.

FIG. 1A shows the conventional electrohydrostatic actuator system 10 which comprises a hydraulic pump 12 and a motor 14 that is configured to drive the pump 12. The motor 14 is an electric motor and may be controllable using a standard power electronic control device. The pump 12 has a first port 16 and a second port 18, each configured for the inflow and outflow of hydraulic fluid. The motor 14 is able to drive the pump 12 in two rotational directions, corresponding to opposite flow directions of the hydraulic fluid through the pump 12.

Hydraulic supply lines 20, 22 are in fluid communication with respective ports 16, 18 and a control valve 30. The control valve 30 is movable between two positions as will be described in more detail herein. In FIG. 1A the control valve 30 is shown in a first, active position.

In its active position the control valve 30 aligns with the supply lines 20, 22 such that hydraulic fluid passes through the control valve 30 to respective supply lines 40, 42 that lead to an actuator 50.

Supply line 20 transfers fluid between a first two-way channel 32 in the control valve 30 and the first port 16 of the pump 12. Supply line 22 transfers fluid between a second two-way channel 34 in the control valve 30 and the second port 18 of the pump 12.

Supply line 40 transfers fluid between the first two-way channel 32 in the control valve 30 and a first, retracting port 60 of the actuator 50. Supply line 42 transfers fluid between the second two-way channel 34 in the control valve 30 and a second, extending port 62 of the actuator 50.

The actuator 50 comprises a sleeve 52 in the form of a cylinder and a piston 70 movable within the sleeve 52. Movement of the piston 70 within the sleeve 52 causes a shaft 70 to move in a linear motion, which in turn actuates a component (not shown).

As indicated by the arrows in FIG. 1A, the pump 12 may operate in a first rotational direction and draw fluid into the first port 16, through supply line 20, the channel 32 of the control valve 30, supply line 40 and from a first chamber 56 of the actuator 50. This, in turn, drives fluid out of the second port 18, through supply line 22, the channel 34 of the control valve 30, supply line 42 and into a second chamber 58 of the actuator 50.

Thus, when rotated in its first rotational direction the pump 12 transfers hydraulic fluid from the first chamber 56 to the second chamber 58, which drives the piston 70 in an actuating direction to actuate the component.

It will be appreciated that rotation of the pump 12 in a second, opposite rotational direction would cause hydraulic fluid to transfer from the second chamber 58 to the first chamber 56, which would retract the piston and de-actuate the component.

When the control valve 30 is shown in its first position the actuator system 10 is in what may be termed an active mode, meaning that hydraulic fluid driven by the pump 12 causes the piston 70 to move back and forth. The actuator system 10 is typically in active mode under normal operating conditions. For example, if the component is an aerodynamic surface such as a steering flap on an aircraft wing, the actuator system 10 would typically be in active mode during flight, as well as shortly before and after.

A reservoir 80 of hydraulic fluid is provided and fluidly connected to each of the supply lines 20, 22, 40, 42 via supply lines 82, 84. Check valves 86 are provided between each of the supply lines 20, 22, 40, 42 and their respective supply line 82, 84.

Figure 1B:
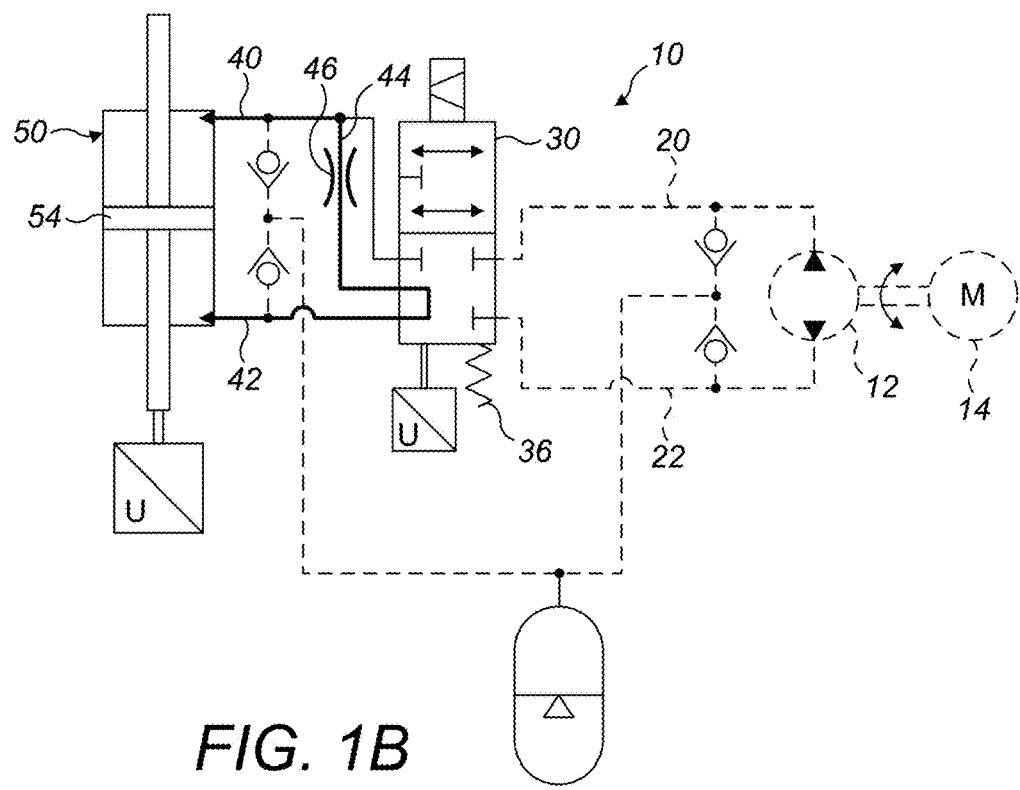

FIG. 1B shows the conventional actuator system 10 in what may be termed a bypass mode. Depending on the type of actuator or component, this may be caused by a power failure in the electronics controlling the motor and/or other components. Alternatively, or additionally, the bypass mode may be caused by the power being intentionally switched off, for example if the component is not required to be actuated. An example may be landing gear, which at a cruise altitude (for example) will not be actuated.

In the bypass mode a spring 36 may force the control valve 30 to a second, or bypass position (as shown in FIG. 1B). The spring 36 may act against a solenoid (for example) that urges the control valve 30 to its first position. When power is not supplied to the solenoid (for example due to power failure or an intentional cut) the spring may automatically force the control valve 30 to its bypass position.

In its bypass position the control valve 30 may activate a bypass line 44. The bypass line 44 may fluidly connect supply line 40 and supply line 42, effectively short-circuiting the first and second chambers 56, 58 of the actuator 50. At the same time, supply lines 20, 22 may be plugged or stopped by the control valve 30. This prevents fluid from flowing through the supply lines 20, 22, as well as through the pump 12. As such, any hydraulic fluid in the pump 12, as well as the supply lines 20, 22 is essentially static.

A flow restriction 46 is provided in the bypass line 44 and this provides a damping effect in the actuator 50. At actuator level, the damping factor is the ratio of the actuator load divided by the square of its speed, and can be set between about 0.05 and 5 daN/(mm/s)$^2$ at ambient temperature. At valve level, the damping factor is the ratio of pressure drop in the restrictor divided by the square of the flow of the fluid passing through it (in Pa·s$^2$/m6) (1 daN/(mm/s)$^2$ is equal to 10E7 N·s$^2$/m). It has been recognised that the damping factor varies due to the variation in the temperature of the hydraulic fluid, which can itself vary upon movement (or lack or movement) of the hydraulic fluid through the bypass line 44. For example, the fluid in the supply lines 40, 42 and the bypass line 44 may heat due to friction, as the piston 70 moves (passively).

It has been found that the temperature of the hydraulic fluid in the supply lines 40, 42 can be quite different to the temperature of the fluid in the supply lines 20, 22 after the control valve 30 has been in its bypass position for a prolonged period of time. For example, the fluid in supply lines 20, 22 may be exposed at least partially to (cold) ambient air, whereas the fluid in the supply lines 40, 42 and the bypass line 44 has been heated as described above. As such, the fluid in the supply lines 20, 22 may have a relatively high viscosity.

When it is possible, or desired to move the control valve 30 back to its first, or active position, having a high viscosity fluid in the supply lines 20, 22 means that a large motor and/or high energy may be required to drive the pump 12. It also means that a limited choice of fluids are possible, namely those having a viscosity that is less affected by temperature variations.

Figure 2:
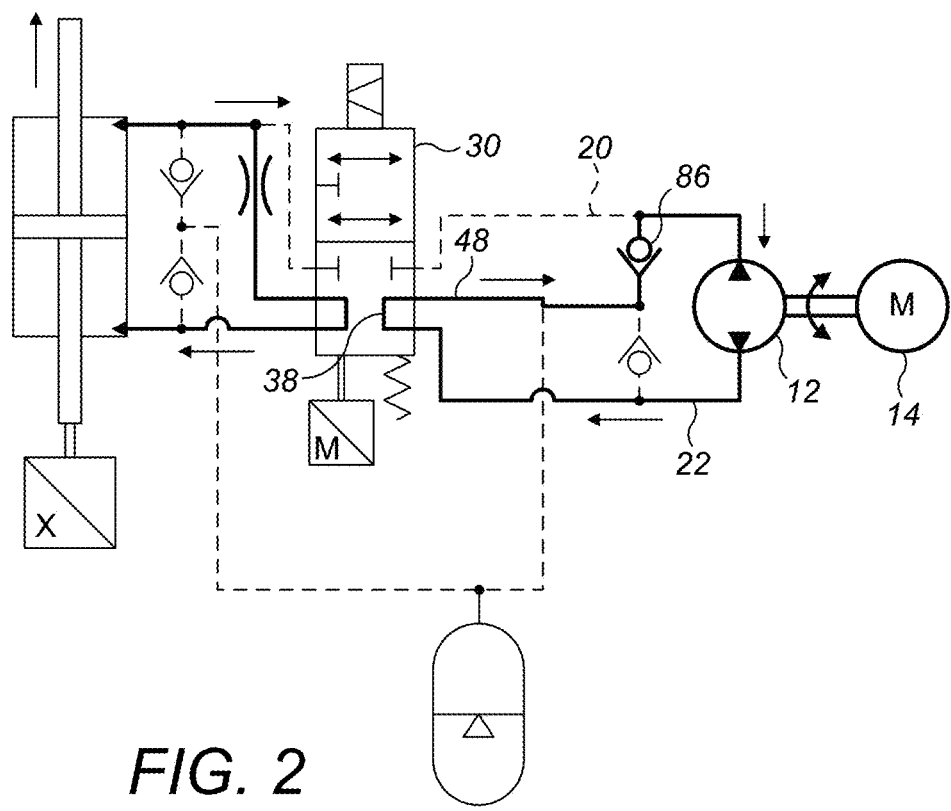
FIG. 2 shows an embodiment of an electrohydrostatic actuator system developed from the conventional arrangement shown in FIGS. 1A and 1B.

FIG. 2 shows a modification of the arrangement of FIGS. 1A and 1B in which a second bypass line 48 is provided that fluidly connects the supply line 20 and the supply line 22 when the control valve 30 is in its bypass position. To do this, the control valve 30 is modified slightly such that a channel 38 is provided in place of a stop, wherein the channel fluidly connects the second bypass line 48 and the supply line 22.

In this embodiment, the motor 14 can rotate the pump 12 in one rotational direction to allow the hydraulic fluid to flow around the bypass circuit comprising the supply lines 20, 22 and the bypass line 48. This embodiment has still been found to cause difficulties when moving the control valve from its bypass position to its active position, however, since the fluid in the supply lines 20, 22 can flow essentially freely through the bypass circuit.

Furthermore, the fluid can only flow in one direction (as shown in FIG. 2). A volume of fluid is still stationary in part of the supply line 20, meaning that the problem of viscosity will still arise. Finally, the number of stoppers on the control valve 30 needs to be increased due to the presence of an extra input from the second bypass line 48.

However, it will be appreciated that the embodiment of FIG. 2 still has advantages over the embodiment shown and described in respect of FIGS. 1A and 1B.

Figure 3A:
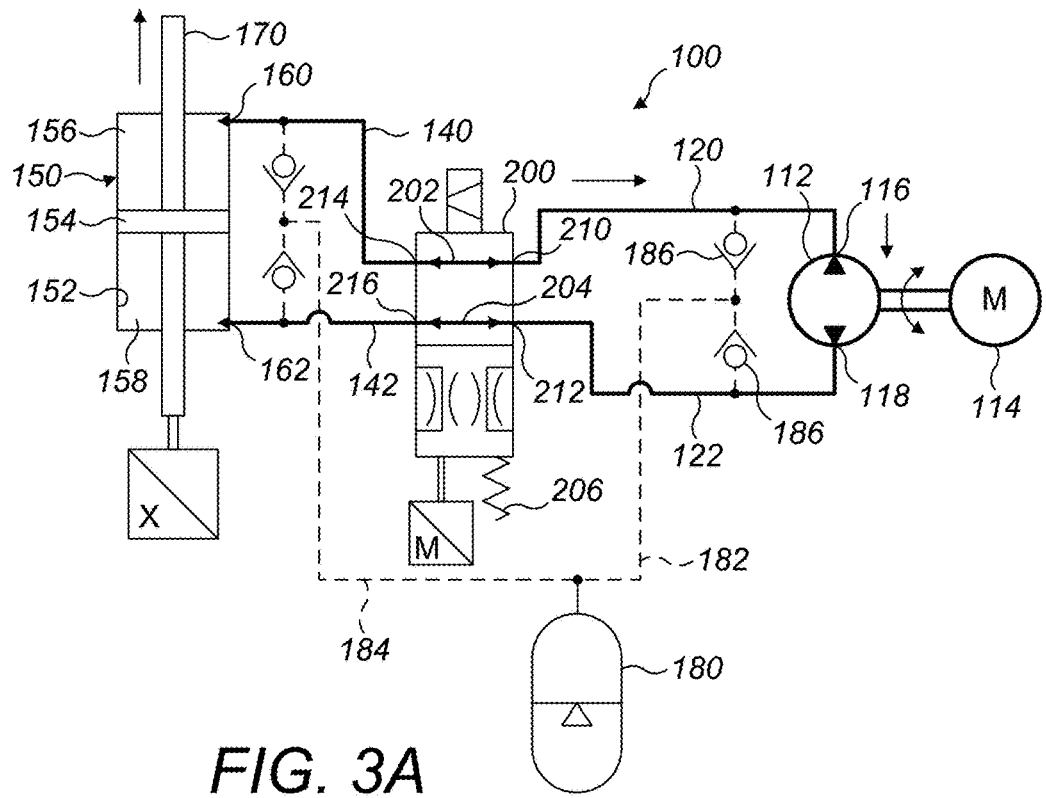
FIGS. 3A and 3B show an embodiment of an electrohydrostatic actuator system according to the present disclosure.
Figure 3B:
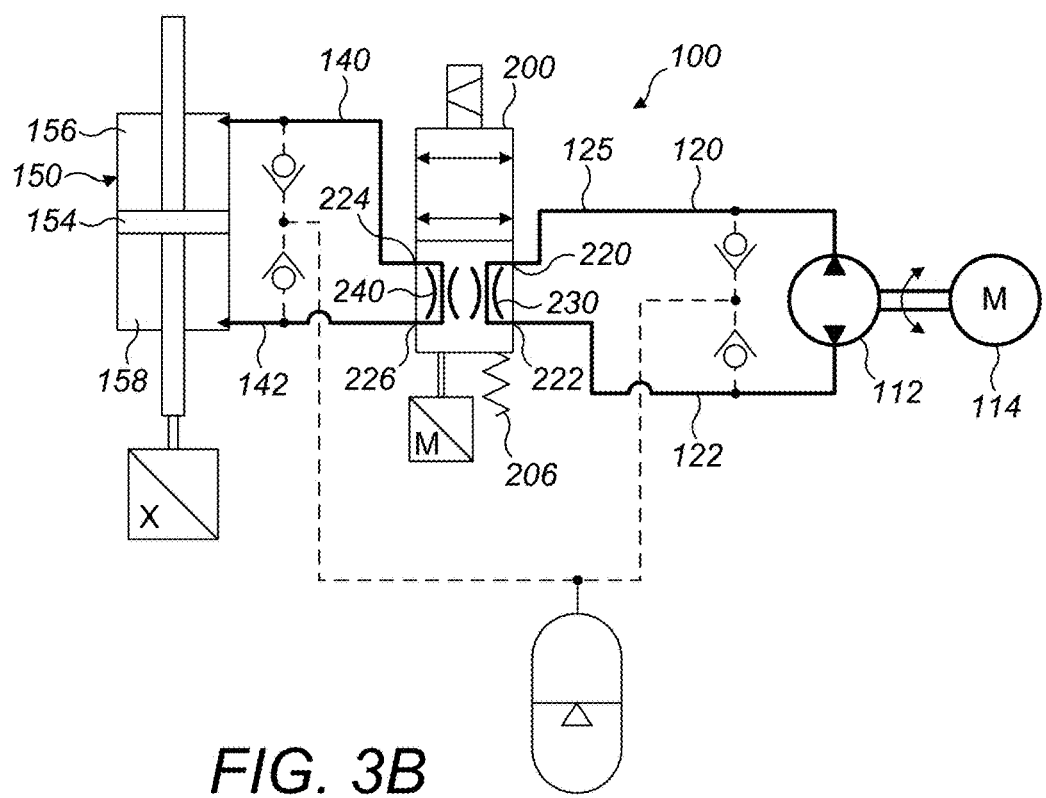

FIGS. 3A and 3B show an embodiment of an electrohydraulic actuator system 100 which comprises a pump 112, for example a hydraulic pump. The actuator system 100 may further comprise a motor 114 that is configured to drive the pump 112. The motor 114 may be an electric motor and may be controllable using a standard electronic control device (not shown). The motor 114 may have a first port 16 and a second port 118, wherein each port 116, 118 may be configured for the inflow and outflow of hydraulic fluid. The motor 114 may be configured to drive the pump 112 in two rotational directions, corresponding to opposite flow directions of hydraulic fluid through the pump 112.

The pump 112 may be arranged and configured to pump hydraulic fluid to and from a control valve 200, for example via first and second hydraulic supply lines 120, 122 that may fluidly connect first and second ports 116, 118 with respective first and second ports 210, 212 of the control valve 200. The control valve 200 may be movable between two or more positions as will be described in more detail herein. Only two positions are shown in FIGS. 3A and 3B, although in various embodiments the control valve 200 may comprise further components and/or have more positions.

FIG. 3A shows the control valve 200 in a first, or active position, corresponding to an active state of the actuator system 100. A solenoid may be provided that is configured to urge the control valve 200 to its first position when energised, for example under normal operating conditions and/or when power is supplied to the actuator system 100 (or the solenoid).

In its active position the control valve 200 conveys hydraulic fluid through to an actuator 150, for example via respective third and fourth supply lines 140, 142. The first port 210 may be in fluid communication with a third port 214 via a first channel 202, so as to fluidly connect the first supply line 120 with the third supply line 140. Similarly, the second port 212 may be in fluid communication with a fourth port 216 via a second channel 204, so as to fluidly connect the second supply line 122 with the fourth supply line 142.

In various embodiments, therefore, the third and fourth supply lines 140, 142 may be in fluid communication with respective first and second supply lines 120, 122.

The first supply line 120 may convey fluid between the first channel 202 (which may be a two-way channel) in the control valve 200 and the first port 116 of the pump 112, and similarly the second supply line 22 may convey fluid between the second channel 204 (which may be a two-way channel) in the control valve 200 and the second port 118 of the pump 112.

The third supply line 140 may convey fluid between the third port 214 of the control valve 200 and a first, retracting port 160 of the actuator 150. The fourth supply line 142 may convey fluid between the fourth port 216 of the control valve 30 and a second, actuating port 162 of the actuator 150.

The actuator 150 may comprise a sleeve 152 and a piston 154 movable within the sleeve 152. Movement of the piston 154 within the sleeve 152 causes a shaft 170 to move in a linear motion, which in turn actuates a component (not shown).

The pump 112 may operate in a first rotational direction so as to draw fluid from a first chamber 156 of the actuator 150, through the third supply line 140, the first channel 202, the first supply line 120 and into the first port 116 of the pump 112. This, in turn, may drive fluid out of the second port 118, through the second supply line 122, the second channel 204, the fourth supply line 142 and into a second chamber 158 of the actuator 150.

Thus, when rotated in its first rotational direction the pump 112 may act to transfer hydraulic fluid from the first chamber 156 to the second chamber 158, which drives the piston 170 in an actuating direction to actuate the component.

It will be appreciated that rotation of the pump 112 in a second, opposite rotational direction would cause hydraulic fluid to transfer from the second chamber 58 to the first chamber 56, which would retract the piston and de-actuate the component.

When the control valve 200 is shown in its first position the actuator system 100 may be considered to be in an active mode, meaning that hydraulic fluid driven by the pump 112 causes the piston 170 to move back and forth. The actuator system 100 is typically in active mode under normal operating conditions. For example, the component may be a vehicle (e.g., aircraft) component and/or an aerodynamic surface, such as a steering flap on an aircraft wing. In this case the actuator system 100 would typically be in active mode during flight, as well as shortly before and after.

A reservoir 180 of hydraulic fluid is provided and fluidly connected to each of the supply lines 120, 122, 140, 142 via fifth and sixth supply lines 82, 84. Check valves 86 are provided between each of the supply lines 120, 122, 140, 142 and their respective supply line 182, 184.

FIG. 3B shows the actuator system 100 in what may be termed a bypass mode.

The actuator system 100 may be changed from the active mode (as shown in FIG. 3A) to the bypass mode due to an automatic system response, such as a power failure in the electronics controlling the motor and/or other components. Alternatively, or additionally, the bypass mode may be activated due to a manual response, such as the power to the actuator system 100 being intentionally switched off, for example if no actuation is required. An example may be landing gear for an aircraft, which at a cruise altitude (for example) does not need to be actuated.

In the bypass mode a spring 206 may force the control valve 200 to a second, or bypass position (as shown in FIG. 1B). The spring 206 may act against the solenoid (for example) that urges the control valve 200 to its first position. When power is not supplied to the solenoid and/or actuator system 100 (for example due to power failure or an operator manually switching off the power) the spring may automatically force the control valve 200 to its bypass position.

The control valve 200 may be configured to fluidly disconnect the pump 112 and the actuator 150 when in its bypass position (and the actuator system 100 is in bypass mode). In other words no fluid that is driven by the pump 112 may flow to the actuator 150 when the control valve 200 is in its bypass position.

In its bypass position the control valve 200 may be configured to fluidly connect the first supply line 120 and the second supply line 122. The first supply line 120 and the second supply line 122 may be connected via a third channel 230 within the control valve 200. The third channel 230 may have a constriction as indicated schematically in FIGS. 3A and 3B, and/or may be constricted relative to the first supply line 120 and the second supply line 122.

In this manner a closed loop 125 may be formed consisting of (and optionally essentially or only of) the pump 112, first supply line 120, third channel 230 and second supply line 122. There may be no one-way and/or check valves located in the closed loop, meaning that hydraulic fluid can be pumped in both directions around the closed loop.

The first supply line 120 may be fluidly connected to the control valve 200 via a fifth port 220, and the second supply line 122 may be fluidly connected to the control valve 200 via a sixth port 222.

It will be appreciated that the various ports of the control valve 200 are shown schematically in FIGS. 3A and 3B. The ports are numbered herein for clarity purposes, but this should not be interpreted as requiring that the ports are (necessarily) different components of the valve. While this may be generally true, some of the ports may constitute the same physical component. For example, as described in more detail below, the second port 214 may be the same hole into the control valve 200 as the sixth port 222.

In its bypass position the control valve 200 may be configured to fluidly connect the third supply line 140 and the fourth supply line 142. The third supply line 140 and the fourth supply line 142 may be connected via a fourth channel 240 within the control valve 200. The fourth channel 240 may have a constriction as indicated schematically in FIGS. 3A and 3B, and/or may be constricted relative to the third supply line 140 and the fourth supply line 142.

In this manner a closed fluid system may be formed consisting of (and optionally essentially or only of) the first chamber 156, third supply line 140, fourth channel 240, fourth supply line 142 and the second chamber 158. Hydraulic fluid may flow around the closed fluid system, for example when the piston 154 moves and the volumes of the first and second chambers 156, 158 changes as a result.

The third supply line 140 may be fluidly connected to the control valve 200 via a seventh port 224, and the fourth supply line 142 may be fluidly connected to the control valve 200 via an eighth port 226.

The flow constrictions formed by or within the third and fourth channels 230, 240 provide a damping effect for the fluid passing therethrough. As discussed above, the damping factor is the ratio of actuator load by its speed, and is usually set between about 0.05 and 5 daN/mm$^2$ at ambient temperature. In this embodiment separate damping factors can be set for each of the hydraulic fluid systems on either side of the control valve 200. The damping factors can also be set using the control valve 200 itself.

Importantly, when the control valve 200 is in its bypass position hydraulic fluid can be circulated around the closed loop 125, and can be passively heated by forcing the fluid through the constriction formed by or within the third channel 230. The pump 112 may be run in order to circulate the fluid. This has many advantages over the conventional approaches described above.

For example, the entirety of the first and second supply lines 120 and 122 can be heated by circulating the hydraulic fluid in bypass mode. This provides a homogeneous heating of the fluid, and improves the response time of the actuator system 100 when changing from damped mode to active mode. This can also improve the response of the actuator system 100 in a cold environment, as the hydraulic fluid may be pre-heated during a bypass mode before the actuator system 100 is switched to active mode. For example, the bypass mode with pre-heating could be run as part of start up routine prior to take-off.

A further advantage is that an increased range of fluid types could be used, for example including those having a high viscosity at low temperatures. Such fluids may not have been usable with conventional arrangements. As discussed above, as the temperature of the fluid drops in bypass mode the viscosity of the fluid may increase to a level that would mean the response time of the actuator, when changing from damped mode to active mode, would be too slow.

The embodiment of FIGS. 3A and 3B is also advantageous over conventional arrangements in that the heating is passive. This is in contrast to an active heating system (such as a tubular heater) that would present safety problems in most applications, and certainly if the actuator were fitted to an airframe.

Furthermore, two damping factors (e.g., two different damping factors) could be set during the bypass mode, one for the fluid system connected to the actuator 150, and another for the fluid system connected to the pump 112 (i.e., the closed loop 125). The damping factors could be tailored with the aim that the hydraulic fluid has the same temperature on both sides of the control valve 200 when changing from damped mode to active mode. The damping factor for each side could be tailored by changing the characteristics (e.g., increasing or decreasing a cross-sectional area) of the constrictions provided within or by the third and fourth channels 230, 240.

The control valve 200 is a compact design that has two positions and four ways, which for example requires fewer seals than conventional arrangements. Such a valve can be embodied in many ways, one of which is shown and described in FIGS. 4A-4D.

FIGS. 4A-4D show a control valve 200 for use in an electrohydraulic actuator, for example the actuator system 100 shown and described in respect of FIGS. 3A and 3B. The valve 200 is shown as comprising a spool 250 and a sleeve 260 forming a linear valve, although other valves could be used in the actuators described herein, including that of FIGS. 3A and 3B, for example a rotary valve could be used.

Figure 4A:
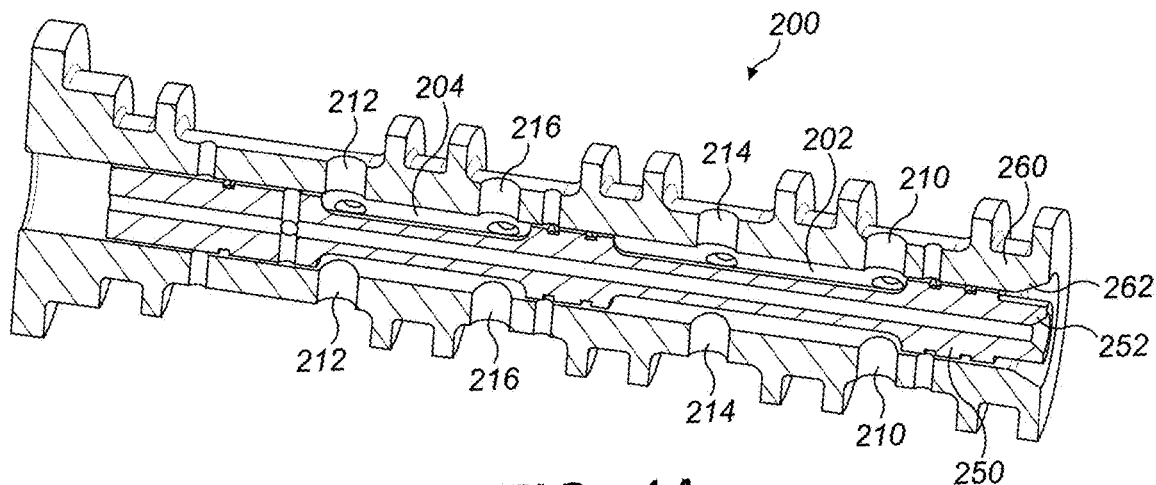
FIG. 4A-4D show a control valve for use in the electrohydrostatic actuator system shown and described in respect of FIGS. 3A and 3B.
Figure 4B:
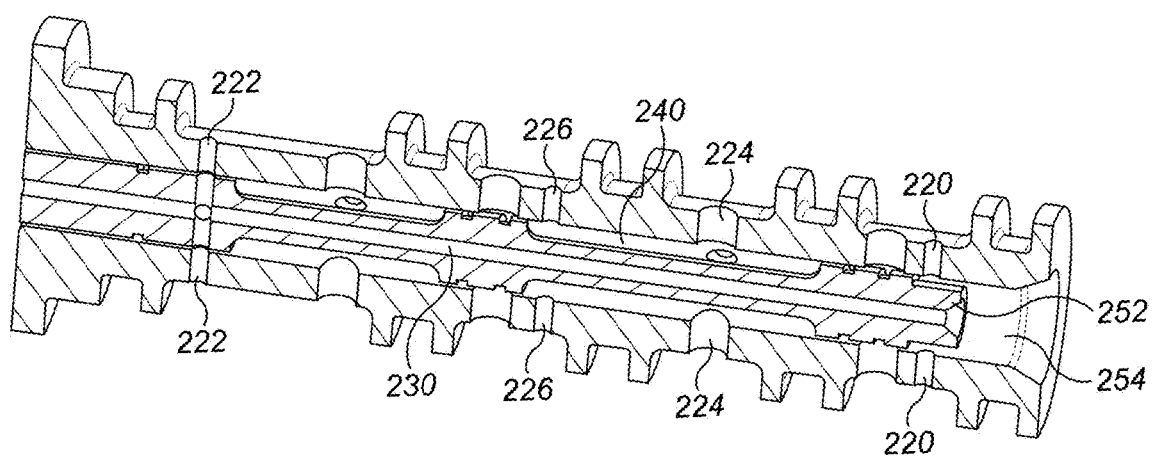
Figure 4C:
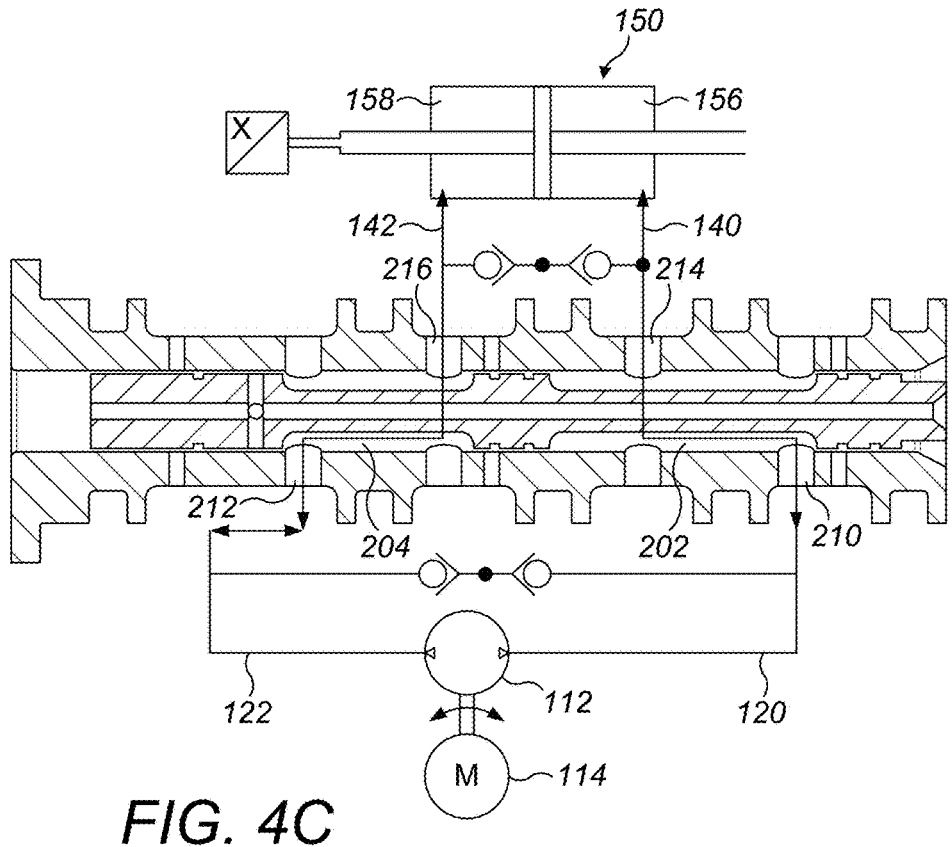

FIGS. 4A and 4C shows the valve 200 in an active position, wherein the spool 250 is moved to the right, for example using a solenoid (not shown). This means that the first port 210 and the third port 214 are fluidly connected via the first channel 202, which extends circumferentially around the spool 250 as shown. The ports as shown in this example are provided in the form of a number of openings around the circumference of the valve 200. In addition, the second port 212 and the fourth port 216 are fluidly connected via the second channel 204, which also extends circumferentially around the spool 250 as shown.

FIG. 4C shows the path of fluid through the valve 200 when the valve is in its active position. Hydraulic fluid may flow through the valve 200 from the first supply line 120, into the first port 210, through the first channel 202, and out of the third port 214 to the third supply line 140 for onward transmission to the first chamber 156 of the actuator 150. At the same time, hydraulic fluid would flow from the second chamber 158 of the actuator 150 and into the fourth port 216, through the second channel 204 and out of the second port 212 into the second supply line 122.

Should the pump 112 be driving fluid in the opposite direction, then the flows described above would be reversed.

Figure 4D:
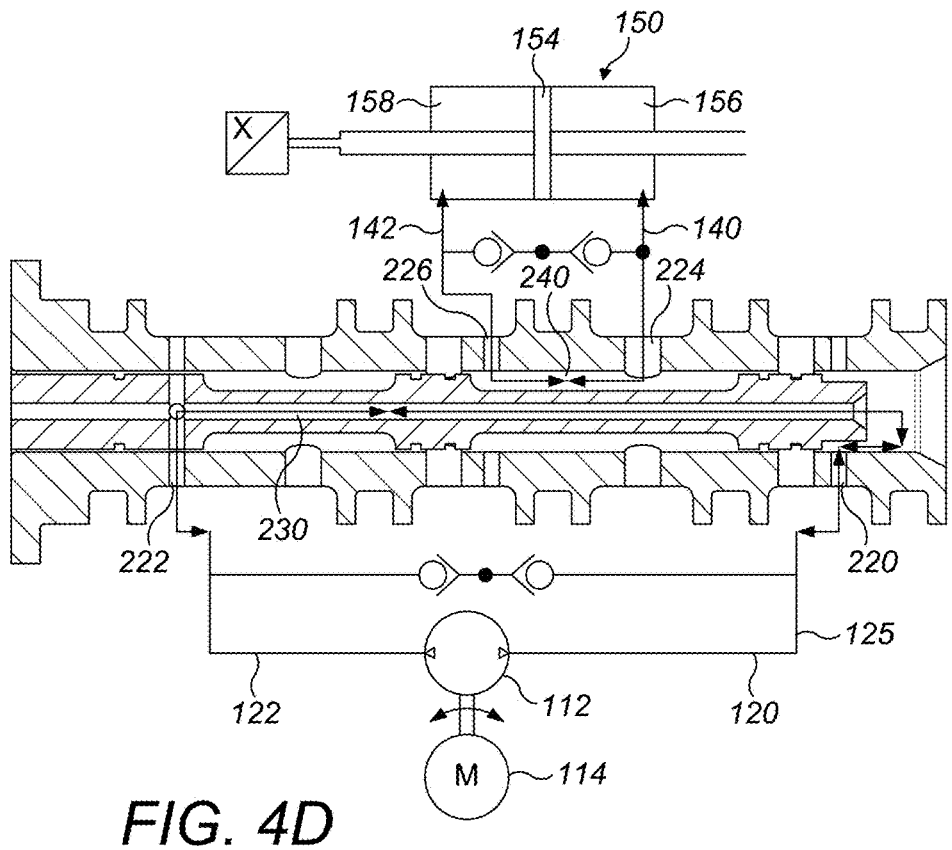

FIGS. 4B and 4D show the valve 200 in a bypass position, wherein the spool 250 is moved to the left, for example using a spring (not shown). This means that the fifth port 220 and the sixth port 222 are fluidly connected via the third channel 230, which extends through the centre of the spool 150 as shown. Again, the ports as shown in this example are provided in the form of a number of openings around the circumference of the valve 200. In addition, the seventh port 224 and the eighth port 226 are fluidly connected via the fourth channel 240, which extends around the circumference of the valve 200 as shown.

FIG. 4D shows the path of fluid through the valve 200 when the valve is in its bypass position. Hydraulic fluid may flow through the valve 200 from the first supply line 120, into the fifth port 220, through the third channel 230, and out of the fourth port 222 to the second supply line 122 for circulation around the closed loop 125. Hydraulic fluid will also move from the first chamber 156 of the actuator 150 and into the seventh port 224, and the fluid will then move through the fourth channel 240, out of the eighth port 226 and into the fourth supply line 142. This will move hydraulic fluid from the fourth supply line 142 into the second chamber 158.

Should the pump 112 be driving fluid in the opposite direction, then the flows described above would be reversed.

In FIGS. 4B and 4D the third channel 230 at the end 252 of the spool 250 is in fluid communication with the fifth port 220 via a chamber 254 formed between the end 262 of the sleeve 260 and the end 252 of the spool 250. The end of the sleeve 260 is blanked off (sealed) although the sealing means is not shown in FIGS. 4A-4D.

FIGS. 5A-5E show a modification of the valve 200 of FIGS. 4A-4D. The features of the valve shown in FIGS. 5A-5E are the same as those of the valve shown in FIGS. 4A-4D, with the exception of how the third channel 230 communicates fluid to the fifth port 220.

Figure 5A:
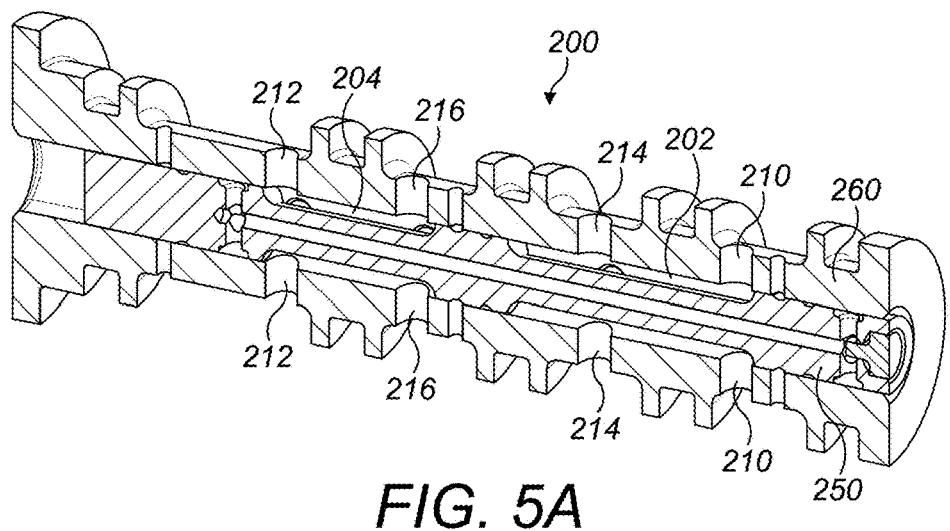
FIGS. 5A-5E show, in cross-section, a modification of the valve of FIGS. 4A-4D.
Figure 5B:
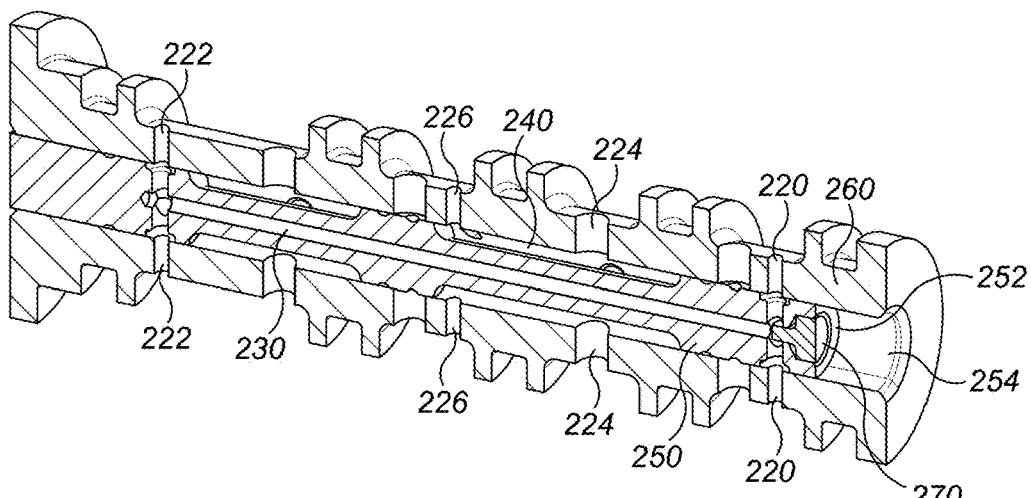
Figure 5C:
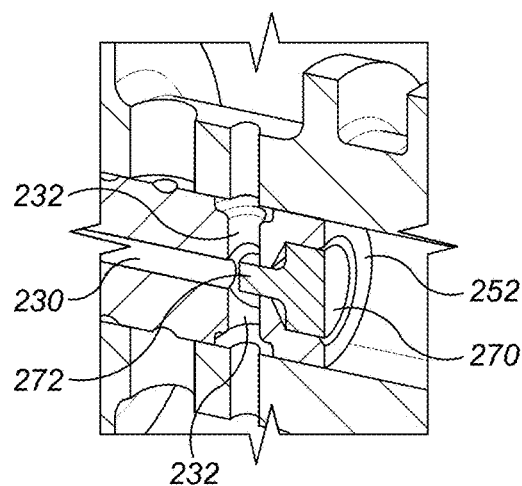
Figure 5D:
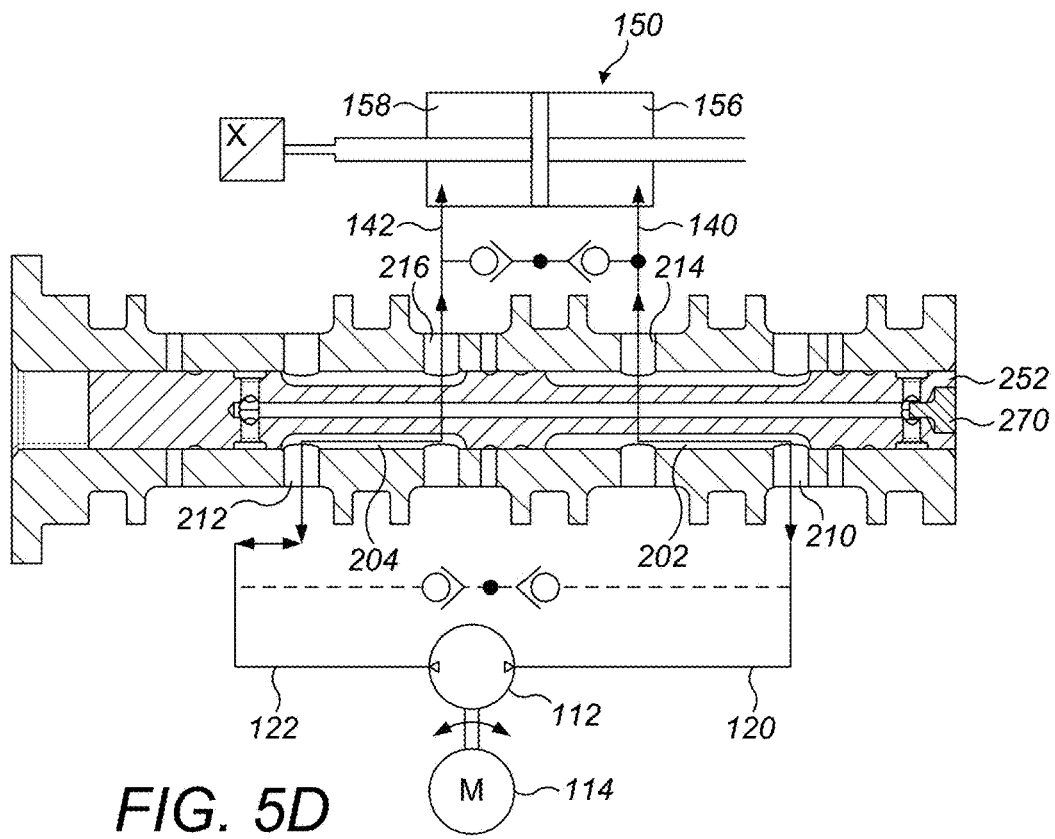
Figure 5E:
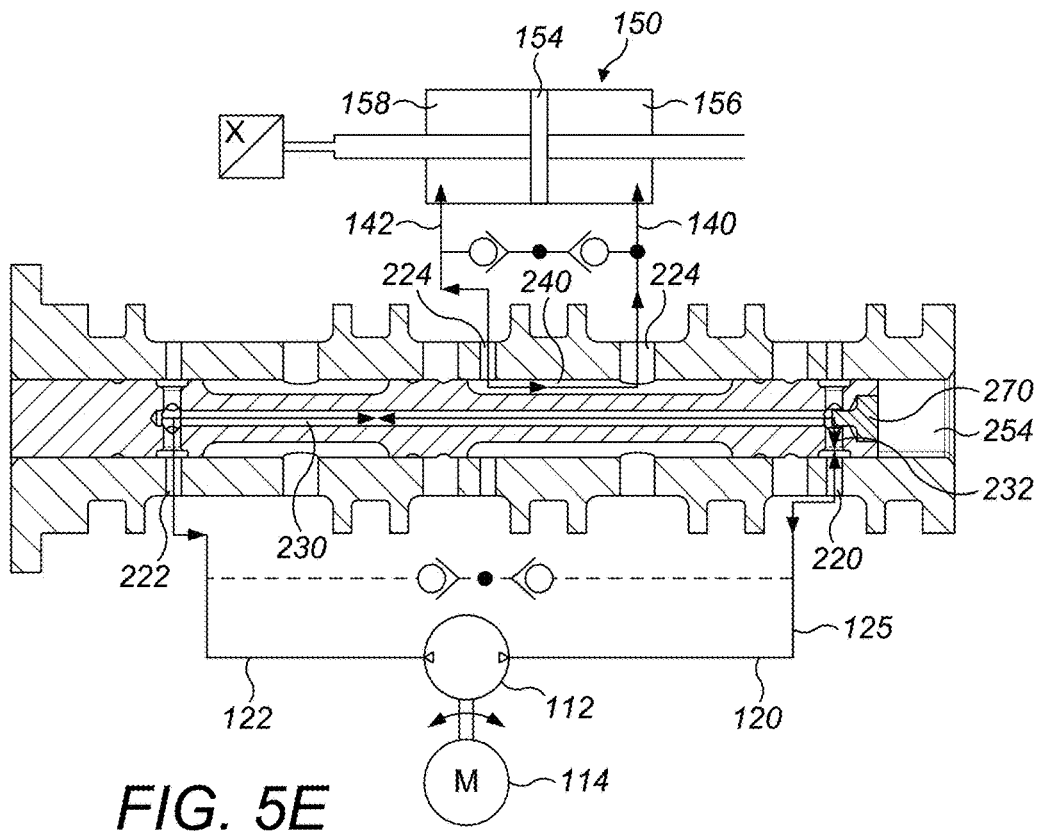

Instead of the third channel 230 being in fluid communication with the fifth port 220 via the chamber 254, as in the embodiment of FIGS. 4A-4D, the third channel 230 is in fluid communication with the fifth port 220 via lateral channels 232 located in the spool 250, as shown in FIGS. 5B and 5C. The spool 25 is sealed against the walls of the sleeve 260 at the end 252, and a plug 270 is inserted into the end 252 of the spool 250 to seal the third channel 230 from the chamber 254. The The plug 270 that is located within the end 252 of the spool 250 can help to avoid pressure that might rise in the chamber 254. Both ends of the valve may be linked to a low pressure circuit. The fluid volume from one end of the valve 200 could move to the other end of the valve during spool motion.

In cases where the damping factor is required to be set, and especially in cases where a small tolerance is required, the plug 270 may be configured such that it can protrude into the third channel 230 by varying amounts. This adjustment could be made during the valve or actuator assembly. For example, the plug 270 may screw into the end 252 of the spool 250 and the amount by which the plug 270 protrudes into the third channel 230 could be set by screwing the plug clockwise and anticlockwise, as appropriate. The plug 270 may comprise a flange 272 that is configured to protrude into the third channel 230 by varying amounts, in use.

Although the present invention has been described with reference to preferred embodiments, it will be understood by those skilled in the art that various changes in form and detail may be made without departing from the scope of the invention as set forth in the accompanying claims.

The invention claimed is:

1. An electrohydrostatic actuator, comprising:
an actuator for driving a component;
a pump configured to pump hydraulic fluid for operation of said actuator; and
a control valve for controlling passage of said hydraulic fluid between said actuator and said pump, wherein said control valve is movable between first and second positions; wherein:
in said first position said control valve is configured to convey hydraulic fluid from said pump through said control valve for operation of said actuator; and
in said second position said control valve is configured to fluidly disconnect said pump and said actuator, and circulate hydraulic fluid arriving from said pump back to said pump via a first constriction within said control valve;
wherein in said second position said control valve is configured to send hydraulic fluid arriving from said actuator back to said actuator via a second constriction within said control valve.

2. An electrohydrostatic actuator as claimed in claim 1, wherein when said control valve is in its second position a closed loop for hydraulic fluid is formed between said pump and said control valve.

3. An electrohydrostatic actuator as claimed in claim 2, wherein said pump is configured to pump hydraulic fluid around said closed loop, including through said first constriction, when said control valve is in its second position.

4. An electrohydrostatic actuator as claimed in claim 1, wherein said first constriction comprises a channel having a reduced cross-sectional area.

5. An electrohydrostatic actuator as claimed in claim 1, wherein said actuator comprises a piston, a first chamber on a first side of said piston and a second chamber on a second, opposite side of said piston, wherein when said control valve is in its second position a fluid path for hydraulic fluid is formed between said first chamber and said second chamber.

6. An electrohydrostatic actuator as claimed in claim 1, further comprising a first supply line and a second supply line for supplying hydraulic fluid between said pump and said control valve.

7. An electrohydrostatic actuator as claimed in claim 6, wherein said first constriction has a reduced cross-sectional area relative to said first supply line and/or said second supply line.

8. An electrohydrostatic actuator as claimed in claim 6, further comprising a third supply line and a fourth supply line for supplying hydraulic fluid between said actuator and said control valve.

9. An electrohydrostatic actuator as claimed in claim 8, wherein said second constriction has a reduced cross-sectional area relative to said third supply line and/or said fourth supply line.

10. An electrohydrostatic actuator as claimed in claim 9, wherein:
   when said control valve is in its first position, said first supply line and said third supply line fluidly connect a first port of said pump to a first port of said actuator, and said second supply line and said fourth supply line fluidly connect a second port of said pump to a second port of said actuator,
   said first port and said second port of said pump form input and output openings for hydraulic fluid being driven by said pump, and
   said first port and said second port of said actuator form extension and retraction openings for hydraulic fluid being conveyed to said actuator.

11. An electrohydrostatic actuator as claimed in claim 8, wherein:
   when said control valve is in its first position, said first supply line and said third supply line fluidly connect a first port of said pump to a first port of said actuator, and said second supply line and said fourth supply line fluidly connect a second port of said pump to a second port of said actuator,
   said first port and said second port of said pump form input and output openings for hydraulic fluid being driven by said pump, and
   said first port and said second port of said actuator form extension and retraction openings for hydraulic fluid being conveyed to said actuator.

12. An electrohydrostatic actuator as claimed in claim 11, wherein said control valve is configured, in its second position, to fluidly connect said first supply line and said second supply line via said first constriction.

13. An electrohydrostatic actuator as claimed in claim 11, wherein said control valve is configured, in its second position, to fluidly connect said third supply line and said fourth supply line.

14. A method of operating an electrohydrostatic actuator, comprising:
   driving a component using an actuator;
   pumping hydraulic fluid to operate said actuator; and
   controlling passage of said hydraulic fluid between said actuator and said pump by moving a control valve between first and second positions; wherein:
   in said first position said control valve conveys hydraulic fluid from said pump through said control valve for operation of said actuator; and
   in said second position said control valve fluidly disconnects said pump and said actuator, and circulates hydraulic fluid arriving from said pump back to said pump via a first constriction within said control valve;
   wherein in said second position said control valve sends hydraulic fluid arriving from said actuator back to said actuator via a second constriction within said control valve.

* * * * *